US 12,481,118 B2

(12) United States Patent
Ito

(10) Patent No.: US 12,481,118 B2
(45) Date of Patent: Nov. 25, 2025

(54) CONTROL APPARATUS, OPTICAL APPARATUS, CONTROL METHOD, AND STORAGE MEDIUM

(71) Applicant: CANON KABUSHIKI KAISHA, Tokyo (JP)

(72) Inventor: Rumi Ito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 357 days.

(21) Appl. No.: 18/347,916

(22) Filed: Jul. 6, 2023

(65) Prior Publication Data

US 2024/0053573 A1 Feb. 15, 2024

(30) Foreign Application Priority Data

Aug. 10, 2022 (JP) .................................. 2022-128208

(51) Int. Cl.
*G02B 7/04* (2021.01)

(52) U.S. Cl.
CPC ...................................... *G02B 7/04* (2013.01)

(58) Field of Classification Search
CPC ... G02B 7/04; G02B 7/08; G02B 7/09; G02B 7/102
USPC ........................................................ 359/813
See application file for complete search history.

(56) References Cited

U.S. PATENT DOCUMENTS

| 9,282,254 | B2 | 3/2016 | Watanabe | |
|---|---|---|---|---|
| 2015/0070567 | A1* | 3/2015 | Kawanishi | ........... H04N 23/673 |
| | | | | 348/349 |
| 2015/0125140 | A1* | 5/2015 | Ashizawa | .............. H02N 2/163 |
| | | | | 396/125 |
| 2016/0202449 | A1* | 7/2016 | Lipson | ..................... G02B 7/09 |
| | | | | 29/469 |
| 2016/0241773 | A1* | 8/2016 | Shida | ..................... H04N 25/51 |
| 2018/0067278 | A1* | 3/2018 | Lipson | ..................... G02B 7/10 |
| 2018/0084189 | A1* | 3/2018 | Shida | ..................... H04N 23/71 |
| 2021/0184600 | A1* | 6/2021 | Ikeda | ....................... G02B 7/04 |

FOREIGN PATENT DOCUMENTS

| JP | 2013029694 A | 2/2013 |
|---|---|---|
| JP | 5674618 B2 | 2/2015 |

* cited by examiner

*Primary Examiner* — William R Alexander
(74) *Attorney, Agent, or Firm* — ROSSI, KIMMS & McDOWELL LLP

(57) ABSTRACT

A control apparatus for an optical apparatus that includes a member and an actuator configured to drive the member includes a memory storing instructions, and a processor configured to execute the instructions to switch a control method for the actuator between a first control method and a second control method configured to make a driving sound generated by the actuator in the second control method smaller than a driving sound generated by the actuator in the first control method, according to a setting about sound in a case where the optical apparatus is used.

12 Claims, 4 Drawing Sheets

| ITEM | SET CONTENT |
|---|---|
| RECORDING START COMMAND | YES/NO |
| SILENT MODE | OFF/ON |
| MICROPHONE VOLUME | 0~10 |

CONTROL APPARATUS, OPTICAL APPARATUS, CONTROL METHOD, AND STORAGE MEDIUM

BACKGROUND

Technical Field

One of the aspects of the embodiments relates to control over an actuator in an optical apparatus, such as a lens apparatus and an image pickup apparatus.

Description of Related Art

Methods for controlling the driving of an actuator in an optical apparatus include, for example, a pulse width modulation (PWM) control method (or digital control method) and a linear control method (DC control method or analog control method). The PWM control method is effective for power saving, but the driving noise of the actuator tends to increase due to fluctuations in the driving voltage and resonance with the actuator. On the other hand, in the linear control method, although the driving sound of the actuator is smaller than that of the PWM modulation control method, power consumption tends to increase.

Japanese Patent No. 5674618 discloses an optical apparatus that drives an actuator by the linear control method during still image capturing, and drives the actuator by the PWM control method during moving image capturing.

The image pickup apparatus disclosed in Japanese Patent No. 5674618 uses the linear control method to reduce image noise during still image capturing, and the PWM control method to suppress power consumption during moving image capturing. However, Japanese Patent No. 5674618 is silent about the driving sound generated by the actuator controlled by the PWM control method and recorded as noise during moving image capturing.

SUMMARY

A control apparatus according to one aspect of the disclosure for an optical apparatus that includes a member and an actuator configured to drive the member includes a memory storing instructions, and a processor configured to execute the instructions to switch a control method for the actuator between a first control method and a second control method configured to make a driving sound generated by the actuator in the second control method smaller than a driving sound generated by the actuator in the first control method, according to a setting about sound in a case where the optical apparatus is used. An optical apparatus having the above control apparatus also constitutes another aspect of the disclosure. A control method corresponding to the above control apparatus and a non-transitory computer-readable storage medium storing a program that causes a computer to execute the above control method also constitute another aspect of the disclosure.

Further features of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a description will be given of embodiments according to the disclosure.

First Embodiment

Figure 1:
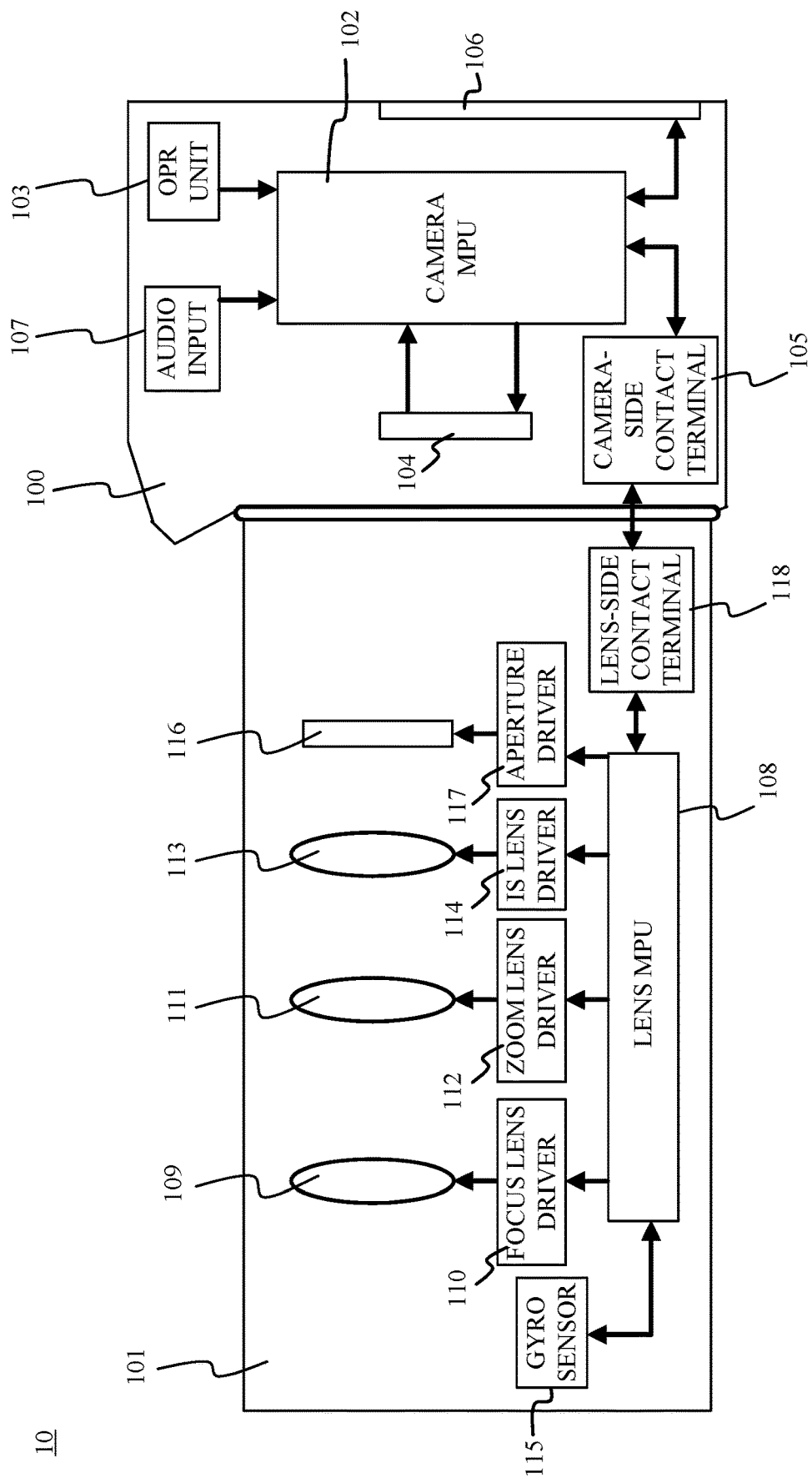
FIG. 1 is a block diagram illustrating the configuration of a camera system according to a first embodiment.

FIG. 1 illustrates the configuration of a camera system 10 including a control apparatus according to a first embodiment of the present disclosure. A camera system 10 includes a camera body 100 as an image pickup apparatus and an interchangeable lens 101 as an optical apparatus.

The camera body 100 includes a camera MPU 102, a camera operation (OPR) unit 103, an image sensor 104, a camera-side contact terminal 105, a liquid crystal monitor 106, and an audio input unit 107.

The image sensor 104 includes a photoelectric conversion element such as a CMOS sensor, and converts an object image formed by an imaging optical system in the interchangeable lens 101 into an electrical signal.

The camera MPU 102 is a control apparatus configured to control the entire camera system 10, and performs processing such as photometry, focusing, and imaging according to an input from the camera operation unit 103 including various operation switches provided in the camera body 100. The camera MPU 102 also performs various settings for the camera system 10 according to an input from the camera operation unit 103. The camera MPU 102 supplies power to the interchangeable lens 101 and communicates various information with the interchangeable lens 101 through the camera-side contact terminal 105 and a lens-side contact terminal 118.

The camera body 100 has a still image capturing function and a moving image capturing function, and can record sound input from the audio input unit 107 together with a moving image during moving image capturing. Whether or not to record (whether to turn on or off the recording function) can be set by the user through the operation of the camera operation unit 103. The liquid crystal monitor 106 is disposed on a back surface of the camera body 100 and displays image data generated by the camera MPU 102 using the output from the image sensor 104, setting information of the camera system 10, and the like.

The interchangeable lens 101 includes a lens MPU 108, a focus lens 109, a focus lens driver 110, a zoom lens 111, a zoom lens driver 112, an image stabilization (IS) lens 113, an IS lens driver 114, a gyro sensor 115, an aperture stop 116, an aperture driver 117, and the lens-side contact terminal 118.

The lens MPU 108 controls the focus lens driver 110 to move the focus lens 109 in the optical axis direction according to the operation of the user of an unillustrated operation member provided on the interchangeable lens 101 or a command (instruction) from the camera MPU 102. The focus lens driver 110 includes a focus actuator such as a stepping motor, a voice coil motor, or a vibration type motor, and a focus driving circuit that supplies driving power to the focus actuator.

The lens MPU 108 controls the zoom lens driver 112 according to the operation of an unillustrated zoom ring to move the zoom lens 111 in the optical axis direction. The zoom lens driver 112 includes a zoom actuator such as a stepping motor or a DC motor, and a zoom driving circuit that supplies driving power to the zoom actuator. In a case where the user rotates the zoom ring, the rotation is detected by an unillustrated rotation sensor, and the lens MPU 108 drives the zoom actuator according to the detection signal from the rotation sensor. In a case where the zoom actuator rotates an unillustrated cam ring, the zoom lens 111 is driven in the optical axis direction by the lift of the cam ring. This configuration enables imaging in a zoomed state from a wide-angle end to a telephoto end.

The lens MPU 108 controls the IS lens driver 114 based on a signal from the gyro sensor 115 configured to detect the shake of the interchangeable lens 101 (camera system 10) to move the IS lens 113 in a direction orthogonal to the optical axis. The IS lens driver 114 includes an IS actuator such as a stepping motor and a voice coil motor, and an image stabilizing lens driving circuit that supplies driving power to the IS actuator.

The aperture driver 117 adjusts the exposure by changing an aperture diameter in the aperture stop 116 under the control of the lens MPU 108. The aperture driver 117 includes an aperture actuator such as a stepping motor and a DC motor, and an aperture driving circuit that supplies driving power to the aperture actuator.

Each of the actuators included in the interchangeable lens 101 can be driven and controlled by two control methods, that is, a pulse width modulation (PWM) control method as a first control method and a linear control method as a second control method. The linear control method is a control method that can make smaller driving noise generated from the actuator than that of the PWM control method. The lens MPU 108 serves as a switching unit configured to switch the control method for each actuator.

Figure 2:
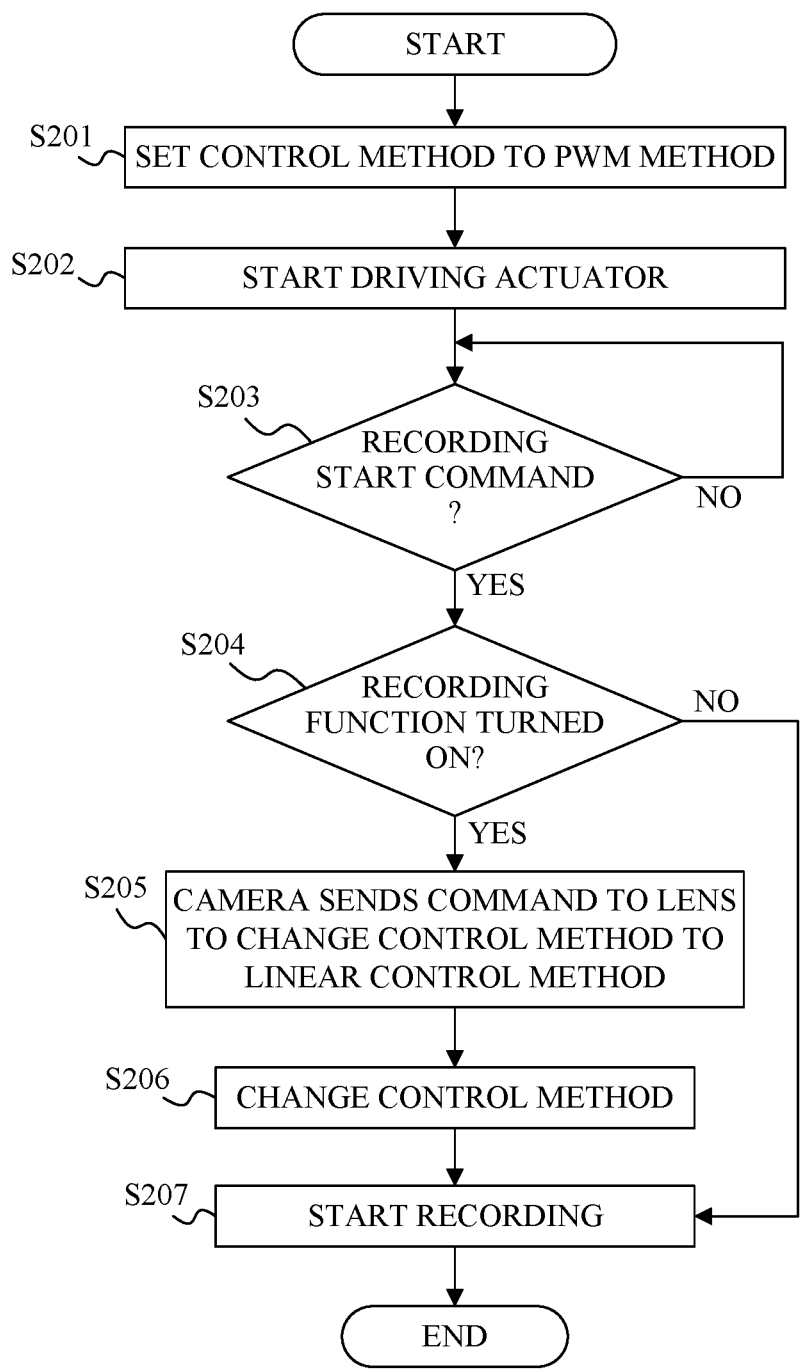
FIG. 2 is a flowchart illustrating control method switching processing according to the first embodiment.

FIG. 2 illustrates actuator control method switching processing (control method) executed by the camera MPU 102 according to a computer program. FIG. 2 illustrates processing for switching the control method for the IS lens driver (IS actuator) 114 as a driver configured to drive the IS lens 113 as a member to be driven.

In a case where power is supplied to the camera body 100 and the interchangeable lens 101, the camera MPU 102 starts this processing. First, in step S201, the camera MPU 102 causes the lens MPU 108 to set the control method for the IS lens driver 114 to the PWM control method.

Next, in step S202, the camera MPU 102 causes the lens MPU 108 to start controlling the IS lens driver 114.

Next, in step S203, the camera MPU 102 determines whether or not there is a command (instruction) to start capturing (recording) a moving image by the operation of the user through the camera operation unit 103. In a case where there is the command to start recording, the flow proceeds to step S204 to determine whether or not the recording function through the audio input unit 107 in the camera body 100 is turned on (enabled). The setting as to whether or not the recording function is turned on is a "setting about sound" in a case where the camera system 10 is used. In a case where the recording function is turned on, the flow proceeds to step S205, and in a case where it is turned off, the flow proceeds to step S207. That is, the control method of the IS lens driver 114 maintains the PWM control method.

In step S205, the camera MPU 102 instructs the lens MPU 108 to change the control method for the IS lens driver 114 to the linear control method. Thereby, in step S206, the lens MPU 108 changes the control method for the IS lens driver 114 to the linear control method.

Next, in step S207, the camera MPU 102 starts recording and ends this processing. Thereafter, the camera MPU 102 stops recording in response to a recording stop command by the operation of the user.

This embodiment can drive the IS lens 113 with low noise by controlling the IS lens driver 114 by the linear control method in a case where the sound recording function is turned on (enabled) during recording. In a case where the recording function is set to be turned off (disabled) during recording, the PWM control controls the IS lens driver 114 and suppresses driving power consumption of the IS lens 113. Thereby, this embodiment can suppress power consumption while preventing the driving sound of the IS lens driver 114 from being recorded as noise.

While this embodiment sets the control method at the beginning of processing to the PWM control method, but may set it to the linear control method. In this case, the control method may be changed to the PWM method in a case where the recording function is turned off.

This embodiment sets the control method according to the setting of turning on and off of the recording function when recording starts. This configuration is to prevent unnecessary movement of the IS lens 113 from being recorded due to a change in the control method of the IS lens driver 114. However, in a case where there is no unnecessary movement of the IS lens 113 due to the change in the control method, or in a case where the influence of the unnecessary movement on an image is negligible, the control method may be switched when the setting of the recording function is changed during recording. The control method may be set to the linear control method according to the enablement setting of the recording function when the camera system 10 is activated (powered on).

Second Embodiment

A description will now be given of a second embodiment according to the present disclosure. The configuration of the camera system according to this embodiment is similar to that of the first embodiment, and common components will be designated by the same reference numerals as those of the first embodiment. The camera system 10 according to this embodiment can set a silent (low-noise driving) mode as a "setting about sound." In a case where the silent mode is set, the camera MPU 102 performs control to suppress the driving sound of each actuator in comparison with to in a case where the silent mode is not set. Thereby, noise can be prevented from being recorded in a case where an external recorder is used because the recording function of the camera body 100 is turned off or the camera body has no recording function.

Figure 3:
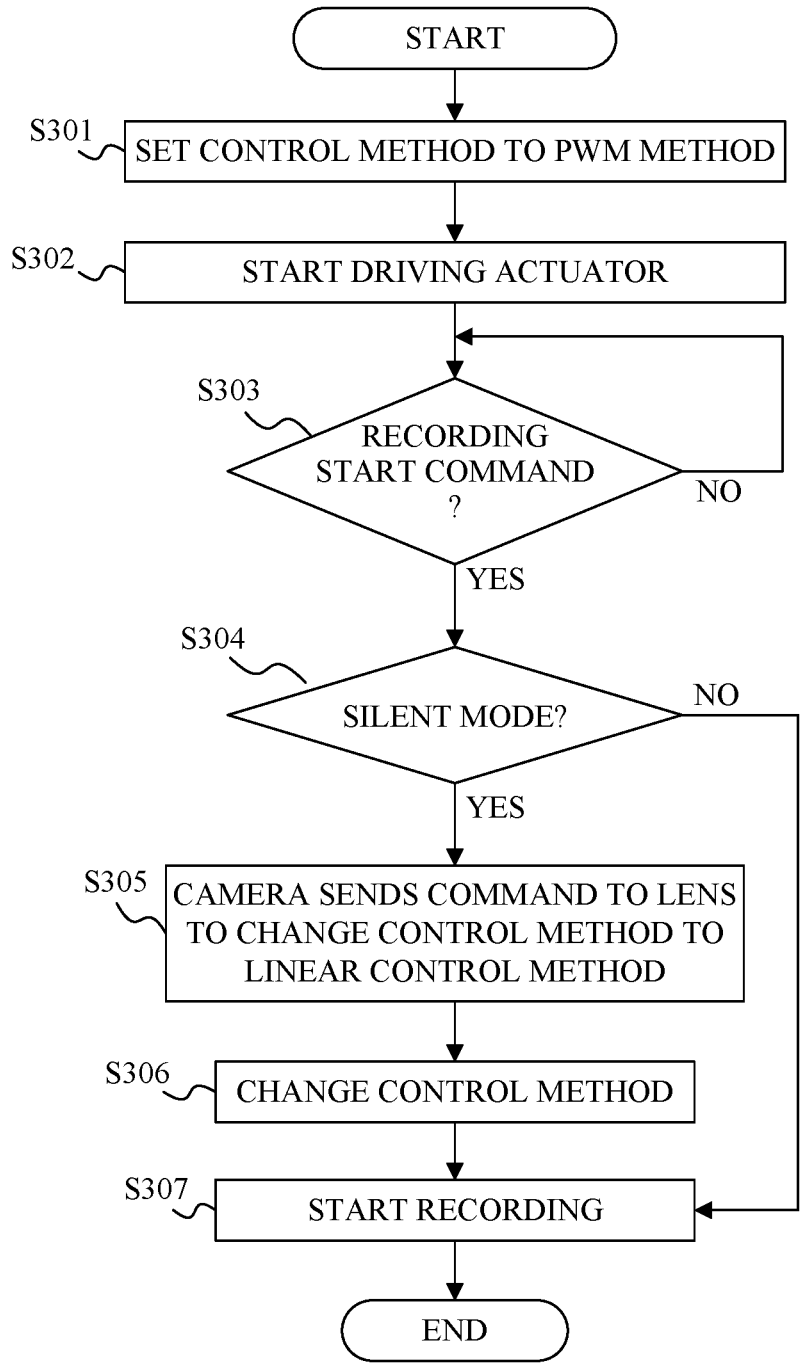
FIG. 3 is a flowchart illustrating control method switching processing according to a second embodiment.

FIG. 3 illustrates actuator control method switching processing executed by the camera MPU 102. FIG. 3 illustrates the processing of switching the control method for the IS lens driver 114.

Steps S301 to S303 correspond to steps S201 to S203 in FIG. 2.

The camera MPU 102, which has proceeded to step S304 due to an instruction to start recording in step S303, determines whether or not the silent mode is set. In a case where the silent mode has been set, the flow proceeds to step S305, and in a case where the silent mode has not been set, the flow proceeds to step S307.

Steps S305 to S307 correspond to steps S205 to S207 in FIG. 2.

This embodiment controls the IS lens driver 114 by the linear control method, in a case where the silent mode is set, and drives the IS lens 113 with low noise. In a case where the silent mode is not set, this embodiment controls the IS lens driver 114 by the PWM control and suppresses driving power consumption of the IS lens 113. Thereby, this embodiment can suppress power consumption while preventing the driving sound of the IS lens driver 114 from being recorded as noise.

In this embodiment, the control method may be switched according to a change in the silent mode setting during recording, or the control method may be switched according to the presence or absence of the silent mode setting in a case where the camera system is started.

Third Embodiment

A description will now be given of a third embodiment according to the present disclosure. The configuration of the camera system according to this embodiment is similar to that of the first embodiment, and common components will be designated by the same reference numerals as those of the first embodiment. However, in this embodiment, the lens MPU 108 serves as a control apparatus (switching unit) configured to switch the control method for the IS lens driver 114. The lens MPU 108 acquires information about the setting of the control method from the camera MPU 102, and switches the control method for the IS lens driver 114 based on the information.

Figures 4, 5:
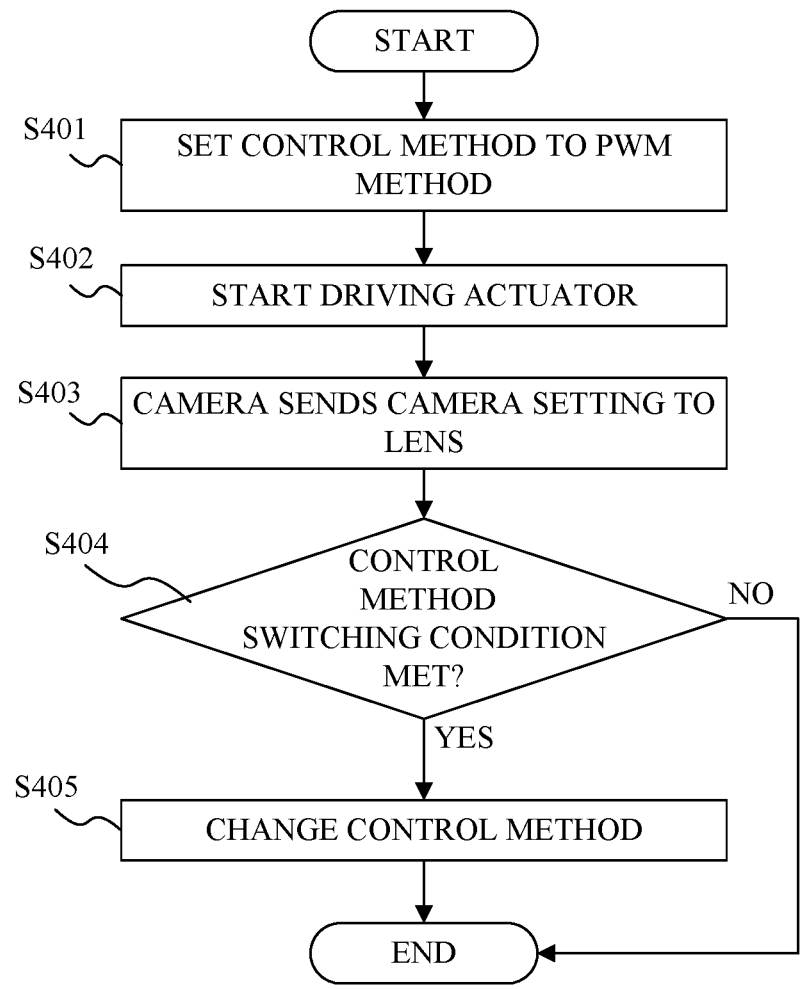
FIG. 4 is a flowchart illustrating control method switching processing according to a third embodiment.
FIG. 5 illustrates control method determination information according to the third embodiment.

FIG. 4 illustrates actuator control method switching processing executed by the lens MPU 108 according to a computer program. FIG. 4 illustrates the processing of switching the control method for the IS lens driver 114.

In a case where power is supplied to the camera body 100 and the interchangeable lens 101, the lens MPU 108 starts this processing. First, in step S401, the lens MPU 108 sets the control method for the IS lens driver 114 to the PWM control method.

Next, in step S402, the lens MPU 108 starts driving the IS lens 113 under the control of the IS lens driver 114.

Next, in step S403, the lens MPU 108 acquires information about the setting of the control method (camera setting information) from the camera MPU 102 through communication. FIG. 5 illustrates an example of information about the setting of the control method. The information about the setting of the control method includes information indicating whether or not there is an instruction to start recording, information indicating whether the silent mode is set or not, information indicating whether the recording function is turned on or off (not shown), and microphone volume information.

Next, in step S404, the lens MPU 108 determines whether or not to switch the control method according to the acquired information about the setting of the control method. In other words, it is determined whether or not the acquired information about the setting of the control method corresponds to the condition for switching the control method from the PWM control method to the linear control method.

For example, in a case where the recording function is turned on and there is a command to start recording, it is determined that the condition for switching the control method from the PWM control method to the linear control method is met. In a case where the microphone volume sound (setting about sound) of the audio input unit 107 set in the camera body 100 is higher than a predetermined value as a threshold, it is determined that the condition for switching from the PWM control method to the linear control method is met. The microphone volume threshold may be different for each model of the camera body 100.

Whether or not the switching condition is met may be determined not only by the information about the setting of the control method on the camera side acquired from the camera MPU 102 but also by the information about the setting of the control method on the lens side previously stored by the lens MPU 108. For example, the lens MPU 108 may acquire from the camera body 100, information on the maximum permissible sound pressure of noise that is permissible to be input through the audio input unit 107 during recording as information about the setting of the control method on the camera side. In this case, the lens MPU 108 previously measures and stores, as information about the setting of the control method on the lens side, information on the sound pressure of the driving sound (driving sound information). In a case where the sound pressure of the driving sound of the IS lens driver 114 actually controlled by the PWM control method becomes larger than the maximum permissible sound pressure of the noise, it may be determined that the condition for switching from the PWM control method to the linear control method is met.

In a case where the interchangeable lens has an operation unit that turns on and off the recording function, sets the microphone volume, etc., it may be determined that the condition for switching from the PWM control method to the linear control method is met based on the information about the setting and the information about the recording start command from the camera side.

Whether or not the switching condition is met may be determined using information about the setting of the control method on the lens side without using information about the setting of the control method on the camera side. For example, the lens MPU 108 may associate the sound pressure (or volume) of the driving sound from the IS lens driver 114 controlled by the PWM modulation control method with the shake magnitude and frequency as the state of the camera system 10 and may previously store the result as information about the setting of the lens-side control method. In a case where the camera shake detected by the gyro sensor 115 is such that the sound pressure (or volume) of the driving sound from the IS lens driver 114 is higher than the maximum permissible value as a predetermined value, it may be determined that the condition for switching from the PWM control method to the linear control method is met.

In a case where the lens MPU 108 determines that the condition for switching from the PWM control method to the linear control method is met, the flow proceeds to step S405. In a case where the lens MPU 108 determines that the condition for switching from the PWM control method to the linear control method is not met, the lens MPU 108 maintains the PWM control method as the control method for the IS lens driver 114 and ends this processing.

In step S405, the lens MPU 108 switches the control method for the IS lens driver 114 to the linear control method. Then, this flow ends.

This embodiment controls the IS lens driver 114 by the linear control method and drives the IS lens 113 with low noise in a case where the specific condition for switching from the PWM control method to the linear control method is met. In a case where the switching condition is not met, this embodiment suppresses the driving power consumption of the IS lens 113 by controlling the IS lens driver 114 by the PWM control. Thereby, this embodiment suppresses power consumption while preventing the driving sound of the IS lens driver 114 from being recorded as noise.

The above embodiments have described the case of switching the control method for the IS actuator inside the interchangeable lens in the lens interchangeable type camera system, but may similarly switch the control method for the focus actuator in the interchangeable lens. At this time, the state of the camera system 10 may be the orientation of the camera system 10 relating to the driving load of the focus actuator.

In a case where image stabilization is available that drives the image sensor in the direction orthogonal to the optical axis in the camera body as the optical apparatus, the control method for the actuator configured to drive the image sensor as a driven member may be switched similarly to the embodiment. In the lens-integrated type camera as an optical apparatus, the actuator control method may be switched similarly to the embodiment.

The above embodiments have discussed the case of switching the control method between the PWM control method and the linear control method, but may switch the control method to another control method.

In the optical apparatus, the above embodiments can reduce power consumption while reducing the driving sound of the actuator during recording.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-128208, filed on Aug. 10, 2022, which is hereby incorporated by reference herein in its entirety.

What is claimed is:

1. A control apparatus for an optical apparatus that includes a member and an actuator configured to drive the member, the control apparatus comprising:
   a memory storing instructions; and
   a processor configured to execute the instructions to:
   switch a control method for the actuator between a first control method and a second control method configured to make a driving sound generated by the actuator in the second control method smaller than a driving sound generated by the actuator in the first control method, according to a setting about sound in a case where the optical apparatus is used.

2. The control apparatus according to claim 1, wherein the setting about the sound includes a setting as to whether or not to perform recording, and
   wherein the processor is configured to set the control method to the first control method in a case where the recording is not to be performed, and sets the control method to the second control method in a case where the recording is to be performed.

3. The control apparatus according to claim 1, wherein the setting about the sound includes a setting as to whether or not to drive the member with low noise, and
   wherein the processor is configured to set the control method to the first control method in a case where the member is not to be driven with low noise, and to set the control method to the second control method in a case where the member is to be driven with low noise.

4. The control apparatus according to claim 1, wherein the setting about the sound includes a setting of microphone volume for recording, and
   wherein the processor is configured to set the control method to the first control method in a case where the microphone volume is lower than a predetermined value, and to set the control method to the second control method in a case where the microphone volume is higher than the predetermined value.

5. The control apparatus according to claim 1, wherein the processor is configured to:
    store information about the driving sound in controlling the actuator by the first control method, and
    switch the control method based on information about the driving sound.

6. The control apparatus according to claim 5, wherein the information about the driving sound includes information about one of sound pressure and volume of the driving sound, and
    wherein the processor is configured to set the control method to the first control method in a case where the one is lower than a predetermined value, and to set the control method to the second control method in a case where the one is higher than the predetermined value.

7. The control apparatus according to claim 5, wherein the actuator is controlled based on an output from a sensor configured to detect a state of the optical apparatus, and
    wherein the processor is configured to switch the control method according to the output from the sensor and the information about the driving sound.

8. The control apparatus according to claim 1, wherein the first control method is a pulse width modulation control method, and the second control method is a linear control method.

9. An optical apparatus comprising:
    the control method according to claim 1;
    the members; and
    the actuator.

10. An optical apparatus comprising the control apparatus according to claim 1, and attachable to and detachable from another optical apparatus including the member and the actuator.

11. A control method for an optical apparatus that includes a member and an actuator configured to drive the member, the control method comprising the step of:
    switching a control method for the actuator between a first control method and a second control method configured to make a driving sound generated by the actuator in the second control method smaller than a driving sound generated by the actuator in the first control method, according to a setting about sound in a case where the optical apparatus is used.

12. A non-transitory computer-readable storage medium storing a program that causes a computer to execute the control method according to claim 11.

* * * * *